Dec. 21, 1965
G. A. MITCHELL
3,224,830
DIFFERENTIAL DRIVE FOR CINEMATOGRAPHS
Filed Sept. 24, 1962
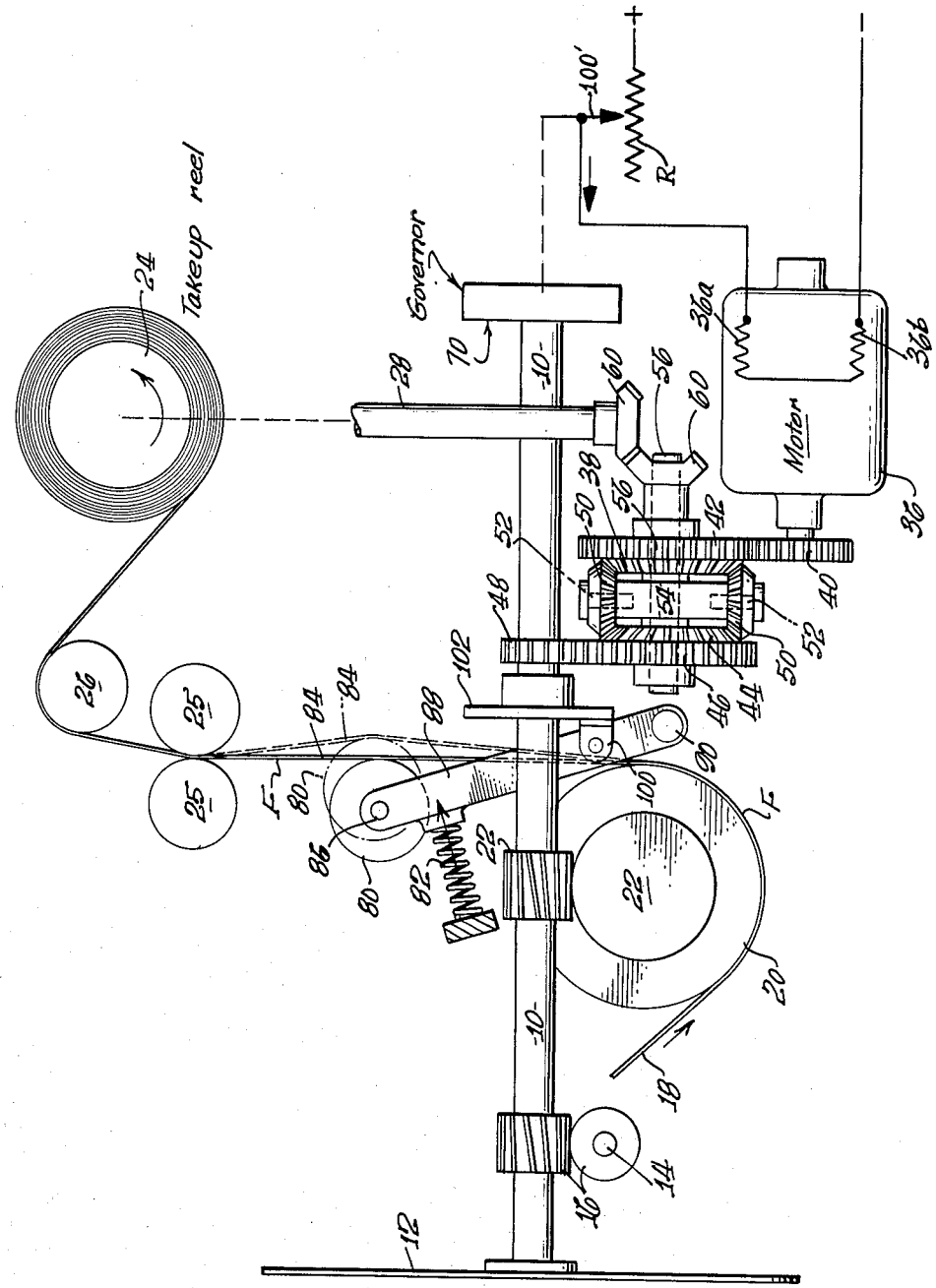
GEORGE A. MITCHELL,
INVENTOR.
BY United States Patent Office 3,224,830
Patented Dec. 21, 1965

3,224,830
DIFFERENTIAL DRIVE FOR CINEMATOGRAPHS
George A. Mitchell, 687 Prospect Crescent,
Pasadena, Calif.
Filed Sept. 24, 1962, Ser. No. 225,735
5 Claims. (Cl. 352—180)

This invention has to do with drives for cinematographic apparatus, such as cameras, printers and projectors. A general purpose and object of the invention is to provide a driving system that will avoid the power dissipation due, in standard equipment, to the frictional slippage of the belt or other slippage drive for the film take-up.

In general, the invention provides a differential system through which both the film movement and the film take-up are driven without power loss due to frictional slippage. The characteristics of the invention will best be understood from the following description of a presently preferred and illustrative embodiment, with reference to the accompanying drawing in which the figure is a schematic illustrating that embodiment.

In the drawing a shutter and film movement driving shaft is indicated at 10, carrying shutter 12 and driving the film movement shaft 14 through gearing 16. The film F, leaving the movement at 18, runs over a sprocket schematically shown at 20 driven in synchronism with the movement, as e.g., by gearing 22 from the shutter shaft 10. From the positively driven sprocket 20, the film F is then pulled by the take-up which is here indicated in the usual form of a driven rotating reel core 24. Numerals 25, 26 indicate the usual free rollers at the film entrance to the take-up magazine. Take-up reel core 24 is here indicated as being driven by a take-up drive shaft 28.

Initial driving power is here indicated as being furnished by electric motor 36 which, as preferably shown here, drives one differential ring gear 38 through gearing 40, 42. The opposite differential ring gear 44 drives shutter shaft 10 through the gear train indicated at 46, 48. Planetary pinions 50, meshing with 38, 44, are carried for free revolution on pins 52 carried by the planetary carrier 54 which is rotatable about the common axis of ring gears 38 and 44. The planetary carrier 54 is rigidly mounted on the axial shaft indicated at 56, about which the ring gears 38, 44 and gearing 42 and 46 are freely revoluble. Axial planetary shaft 56 drives the take-up drive shaft 28 through gearing 60.

It is noted here that it is immaterial which of the three elements of the differential is initially driven, and which of the other two elements drives the movement or the take-up. In any given case, the rotational relations between the three elements is fixed, and the transmission of power or load reaction through the gearing between the two driven elements is the same. However, it is preferred here to drive the more slowly rotating take-up spool from the planetary carrier which rotates more slowly than either of the ring gears.

A speed governor 70, which rotates in synchronism with the shutter and film movement is here indicated as being mounted on shutter shaft 10. The governor functions to regulate the speed of driving motor 36 to keep the movement and shutter drive at the desired r.p.m. usually 24 revolutions of shutter shaft 10 per second.

The drawing shows in diagram an illustrative speed control system. Motor 36 may, for instance, be a variable speed D.C. motor, series wound, with field and armature windings indicated at 36a and 36b. Its circuit is shown to include variable resistance R, travelled by a contact 100'. Governor 70, of any suitable known type, functions to move contact 100 on resistance R, moving the contact in the direction indicated to increase the value of the resistance in the motor circuit as the speed of shaft 10 and governor 70 increases. Such governors usually include a spring opposing such movement and adjustment of the spring then sets the motor speed at that which drives the movement and shutter shaft 10 at the desired r.p.m.

The power required to drive the take-up reel 24 is represented by

T × r.p.m. (of take-up reel) where T represents the required torque. Torque T is represented by $T = f \times R$ where $f$ is the tension maintained on the film by its pull from driven sprocket 20, and R is the radius of the film coil on the take-up reel 24. The required power then is $f \times R \times$ r.p.m. R and r.p.m. vary relatively inversely, so the required power varies solely as $f$. If that value, the film tension, is kept constant, the required power is then constant; or, the other way around, if the power delivered to the take-up is constant, the film tension remains constant.

A roller 80 is pressed by a light spring 82 against film F in its run 84 between sprocket 20 and the take-up. As shown here, roller 80 is mounted for free rotation on a pin 86 carried by an arm 88 pivoted at its other end on a fixed pivot 90. If the tension on the film run 84 decreases roller 80 and its carrier arm 88 are pressed by spring 82 toward such a position as indicated in broken lines for the roller and film run 84. That movement of carrier arm 88 presses a brake shoe 100 against a disk 102 on shutter shaft 10 with a braking force that varies with the decrease in tension in film run 84.

The power required to drive the film movement and its connected gearing at a constant speed is also constant, as the required torque is constant. Governor 70 regulates motor 36 to drive the movement drive shaft 10 at constant speed. The power or load reaction through the differential elements 44, 50, 54 consequently applies that same constant power to the take-up drive to maintain constant film tension. The actual tension may then be set by the gearing ratio between the differential and the take-up spool.

To drive the movement at constant speed, the motor speed of course varies as the rotational speed of the take-up spool varies. But at any motor speed equal power is transmitted through the differential to the movement and take-up.

In normal operation spring 82 may press the film run 84 somewhat out of a straight line, and normally exert some braking pressure at 100. If, then, the film tension varies, e.g., lessens, the resultant spring pressed movement of 80 applies greater braking force to the movement drive, demanding more power from the driving motor at the constant speed maintained by the governor. That, and incipiently falling speed of the movement shaft, automatically applies more power and temporarily higher speed to the take-up drive, resulting in film tension increase. The opposite occurs if the film tension increases and the braking effect at 100 lessens. However, as stated above, with the movement shaft 10 driven at constant speed with constant power, that same amount of power is constantly delivered to the take-up, resulting in constant film tension. The tension actuated brake 100 alleviates any slight departure from perfect operation through the differential.

I claim:
1. In kinetographs, the combination of a film driving and feeding mechanism, a film take-up mechanism that pulls the film on a film run from the driving and feeding mechanism and winds it in a roll of increasing size,
   and driving means for the film driving and feeding and film take-up mechanisms including,
   a differential gearing of three elements, an initial driving motor directly driving one of the three elements, driving connections between each of the other two elements, respectively, and the film driving and feeding mechanism and the film take-up mechanism, and a governor device connected to and operating in synchronism with the film driving and feeding mechanism and acting to regulate the driving motor speed to drive the film driving and feeding mechanism at a predetermined speed.

2. The combination defined in claim 1 and including also a movable member exerting lateral pressure against the film in its run from the driving and feeding mechanism, and braking means adapted to apply braking friction to the interconnected differential element and film driving and feeding mechanism, by virtue of movement of said pressure member pressing the film laterally.

3. In web feeding and take-up mechanisms, the combination of a web feeding mechanism, a web take-up mechanism that pulls the web on a web run from the feeding mechanism and winds it in a roll of increasing size, and driving means for the web feeding and take-up mechanisms including, a differential gearing of three elements, an initial driving motor directly driving one of the three elements, driving connections between each of the other two elements, respectively, and the web feeding and take-up mechanisms, and a governor device connected to and operating in synchronism with the web feeding mechanism and acting to regulate the driving motor speed to drive the web feeding mechanism at a predetermined speed.

4. The combination defined in claim 3 and including also a movable member exerting lateral pressure against the web in its run from the feeding mechanism, and braking means adapted to apply braking friction to the interconnected differential element and web feeding mechanism, by virtue of movement of said pressure member pressing the film laterally.

5. In kinetographs, the combination of a film driving and feeding mechanism and a film exposing shutter, a film take-up mechanism that pulls the film on a film run from the driving and feeding mechanism and winds it in a roll of increasing size, a shutter shaft from which the driving and feeding mechanism is synchronously operated, and driving means for the shutter shaft and the film take-up mechanism including, a differential gearing of three elements, an initial driving motor directly driving one of the three elements, driving connections between each of the other two elements, respectively, and the shutter shaft and the film take-up mechanism, and a governor device connected to and operating in synchronism with the shutter shaft and acting to regulate the driving motor speed to drive the shutter shaft at a predetermined speed.

References Cited by the Examiner

UNITED STATES PATENTS

| | | | |
|---|---|---|---|
| 1,786,917 | 12/1930 | Oehmichen | 242—75.5 |
| 1,982,461 | 11/1934 | Winther | 242—75.51 |
| 2,012,208 | 8/1935 | Wildy | 242—75.5 X |

FOREIGN PATENTS 782,480  3/1935  France.

MERVIN STEIN, *Primary Examiner.*

RUSSELL C. MADER, *Examiner.*